(12) United States Patent
Bullock

(10) Patent No.: US 8,128,324 B2
(45) Date of Patent: Mar. 6, 2012

(54) CARGO RESTRAINT METHOD WITH ENHANCED SHEAR STRENGTH

(76) Inventor: Matthew Bullock, McLean, VA (US)

(*) Notice: Subject to any disclaimer, the term of this patent is extended or adjusted under 35 U.S.C. 154(b) by 252 days.

(21) Appl. No.: 12/481,345

(22) Filed: Jun. 9, 2009

(65) Prior Publication Data
US 2010/0310336 A1 Dec. 9, 2010

(51) Int. Cl.
B61D 45/00 (2006.01)
(52) U.S. Cl. ........................................ 410/97
(58) Field of Classification Search .............. 410/32, 410/34, 36, 42, 96, 97, 100, 155; 220/1.5; 206/410, 597; 53/399, 441, 462, 556; 248/499
See application file for complete search history.

(56) References Cited

U.S. PATENT DOCUMENTS

| | | |
|---|---|---|
| 1,705,060 A | 3/1929 | Hintz |
| 2,269,286 A | 1/1942 | Ott |
| 3,547,457 A | 12/1970 | Langer |
| 3,612,463 A | 10/1971 | Grant |
| 3,848,889 A | 11/1974 | Sharrow |
| 3,897,919 A | 8/1975 | Weingarten |
| 3,910,558 A | 10/1975 | Brucker et al. |
| 4,054,226 A | 10/1977 | Bjelland et al. |
| 4,111,132 A | 9/1978 | Plut |
| 4,264,251 A * | 4/1981 | Blatt ............................ 410/100 |
| 4,553,888 A | 11/1985 | Crissy et al. |
| 4,640,853 A | 2/1987 | Schmeal et al. |
| 4,846,610 A | 7/1989 | Schoenleben |
| 4,964,771 A | 10/1990 | Callihan |
| 5,037,256 A | 8/1991 | Schroeder |
| 5,062,751 A | 11/1991 | Liebel |
| 5,086,038 A | 2/1992 | Naef et al. |
| 5,132,156 A | 7/1992 | Trussare, Jr. et al. |
| 5,139,842 A | 8/1992 | Sewell |
| 5,219,251 A | 6/1993 | Kanczuzewski |
| 5,431,284 A | 7/1995 | Wilson |
| 5,484,643 A | 1/1996 | Wise et al. |
| 5,516,244 A | 5/1996 | Baka |

(Continued)

FOREIGN PATENT DOCUMENTS

EP 1 184 436 A1 3/2002

(Continued)

OTHER PUBLICATIONS

"Superior equipment capacity spurs B.C. paper maker's switch to CP Rail," CP Rail Report, Sep./Oct. 1989, p. 1.

(Continued)

*Primary Examiner* — H Gutman
(74) *Attorney, Agent, or Firm* — Bradford Kile; Kile Park Goekjian Reed & McManus PLLC

(57) ABSTRACT

A load restraint method and system for securing cargo within transport containers wherein the angle $\theta$ of attachment between a side wall of a container and a reinforcing strip of material attached to the side wall is maintained at 15 degrees or less in accordance with the formula $B \leq \cot \theta \cdot A$, where $\theta$ is the angle formed between an exterior surface of said load restraining strip and an interior plane of the lateral wall surface of the transport container "A" is the distance from a front edge of a load to an adjacent side wall and "B" is the distance along the wall of the container behind the point of contact of the restraining strip with an edge of the load to be restrained.

11 Claims, 7 Drawing Sheets

U.S. PATENT DOCUMENTS

| | | | |
|---|---|---|---|
| 5,568,636 A | 10/1996 | Koford | |
| 5,595,315 A | 1/1997 | Podd et al. | |
| 5,784,761 A | 7/1998 | Allen | |
| 5,846,038 A | 12/1998 | Bostelman | |
| 5,855,459 A | 1/1999 | Krier et al. | |
| 5,947,666 A | 9/1999 | Huang | |
| 6,089,802 A * | 7/2000 | Bullock | 410/97 |
| 6,227,779 B1 * | 5/2001 | Bullock | 410/98 |
| 6,368,036 B1 * | 4/2002 | Vario | 410/98 |
| 6,419,434 B1 | 7/2002 | Rahn | |
| 6,435,787 B1 | 8/2002 | John | |
| 6,527,488 B2 | 3/2003 | Elze et al. | |
| 6,533,513 B2 | 3/2003 | Kanczuzewski et al. | |
| 6,568,636 B2 | 5/2003 | Fitzgerald et al. | |
| 6,607,337 B1 * | 8/2003 | Bullock | 410/97 |
| 6,702,532 B1 | 3/2004 | Throener | |
| 6,758,644 B1 * | 7/2004 | Vick | 410/100 |
| 6,896,459 B1 * | 5/2005 | Bullock | 410/97 |
| 6,923,609 B2 * | 8/2005 | Bullock | 410/97 |
| 6,981,827 B2 * | 1/2006 | Bullock | 410/100 |
| 7,018,151 B2 * | 3/2006 | Bullock | 410/97 |
| 7,066,698 B2 * | 6/2006 | Bullock | 410/97 |
| 7,290,969 B2 * | 11/2007 | Bullock | 410/97 |
| 7,329,074 B2 * | 2/2008 | Bullock | 410/97 |
| 2003/0206782 A1 | 11/2003 | Toglia | |

FOREIGN PATENT DOCUMENTS

WO  93/01979 A1  2/1993

OTHER PUBLICATIONS

"Reduce Damage to Bags," Modern Railroads, Apr. 1954, pp. 143-144.

"Hexacomb kraft honeycomb: Pactiv Panels" Sales Brochure, Copyright 1996.

Ty-Gard Sales Brochure, Walnut Industries, at least as early as 1998.

* cited by examiner

CARGO RESTRAINT METHOD WITH ENHANCED SHEAR STRENGTH

RELATED PATENTS

This application relates to U.S. Pat. No. 6,089,802 entitled "Cargo Restraint System for a Transport Container" issued on Jul. 18, 2000; U.S. Pat. No. 6,227,779 entitled "Cargo Restraint Method for a Transport Container" issued on May 8, 2001; U.S. Pat. No. 6,607,337 entitled "Cargo Restraint System" issued on Aug. 19, 2003; U.S. Pat. No. 6,896,459 issued on May 24, 2005; U.S. Pat. No. 6,923,609 issued on Aug. 2, 2005; U.S. Pat. No. 7,018,151 issued on Mar. 28, 2006; U.S. Pat. No. 7,066,698 issued on Jun. 27, 2006; U.S. Pat. No. 7,290,969 issued on Nov. 6, 2007; and U.S. Pat. No. 7,329,074 issued on Feb. 12, 2008 all of common inventorship and assignment as the subject application.

BACKGROUND OF THE INVENTION

This invention relates to an improved method and system for restraining cargo during transportation. More particularly, this invention relates to a novel method and system for securing and restraining undesired movement of drums, boxes, rigid and flexible containers, palletized or not palletized, within the interior of an intermodal container, overland transport, or the like. Moreover this invention relates to a method and system of enhanced securement, attachment and strength to reduce load shifting during transport.

Most shipments for export, both in the United States and abroad, are placed within intermodal containers. Intermodal containers are often loaded with cargo in containment isolation enclosures such as boxes, fifty five gallon closed head drums, super sacks or plastic reinforced bags, plastic wrapped bundles, cased goods, metal coils, specialty heavy paper rolls, plastic or metal containers mounted on pallets, and the like. Although each containment enclosure or bundle may be quite heavy and stationary at rest, the mass of a transport load can produce considerable momentum force as a result of ship, railcar, or truck changes in motion.

Intermodal containers have standardized dimensions of twenty or forty feet in length and are fabricated with steel, corrugated sidewalls which are structurally self-supporting and very rugged. The containers can be stacked onto ships for ocean transport and are subjected to wave forces including: yaw, pitch, heave, sway, and surge. Each of these forces has the potential to apply substantial forces on the contents within the intermodal container. In this, when a container changes direction or speed, cargo within the container tends to continue along the previously existing path until it contacts an interior wall of the container. Without some type of restraint and/or cushioning system, the cargo builds up considerable momentum, independent of the container. The amount of momentum is equal to the mass of a load multiplied by its velocity. In the case of large cargo loads, even a small change in velocity or direction can generate substantial forces.

On overland routes intermodal containers are often "piggybacked" onto railroad flat cars and/or truck trailers. Rail cars may be made up by a coupling or humping process within a switching yard. When a railroad car is rolled into a stationary string of cars, the impact causes the car couplings to lock together with a jolt. This impact can apply a significant force to cargo within the rail car. Moreover, during transport, railway cars are subject to braking forces, run-in and run-out, coupler impact over grades, rail vibration, dips in the track, and swaying. In a similar manner trucks are subject to stopping and starting forces, emergency braking, bumps and swaying from uneven road beds, centrifugal forces on curves, vibration, etc. which tend to shift loads.

When cargo contacts the interior walls or doors of a container, the force necessary to reduce its momentum to zero must be absorbed by the goods and/or the container. Such forces can result in damage to cargo, damage to interior walls or doors of the container, damage to cargo packing, and may create dangerous leaks if the cargo is a hazardous material. Accordingly, it is undesirable to permit cargo to gain any momentum independent of a container during transport. This is accomplished by restraining the cargo within the container so that the cargo and the container are essentially united and operationally function as one object during transport.

In order to secure the load during transport and minimize undesired shifting and damage, load containment enclosures are often secured to the floor and/or sides of the intermodal container, boxcar or trailer by specially fabricated wood framing, floor blocking, rubber mats, steel strapping, heavy air bags, etc. Each of these previously known systems for securement have limitations associated with construction cost, lack of strength sufficient to secure dense loads, etc. Moreover, although rear doors of a trailer may be relied on to at least partially secure non-hazardous materials such as food-stuffs, tissue or soft paper products, furniture, appliances, etc., for hazardous materials, and many other types of loads, the rear doors of a container may not be used to even partially secure a load. In fact, in order to comply with Department of Transportation Regulations and Bureau of Explosives, hazardous materials are not even permitted to come in contact with or "touch" rear container doors during an impact.

Still further in some instances a trailer or boxcar may be used for shipping where only a partial load is carried. Moreover, a partial load might be positioned within a center location of a trailer. In this instance it may be impractical to construct wooden front and rear dunnage sufficient to secure a load where the front of the trailer is not utilized. Additionally some partial loads are not symmetrically positioned on a pallet and securement must therefore accommodate an asymmetric load.

In the past, various dunnage materials have been utilized within intermodal containers, rail cars, and/or trailers to eliminate unwanted movement or shifting of a load during transport. The boxes, drums, or other containers have been restrained in several different ways. Primarily, cargo was stabilized by a method of load-locking and lumber bracing. This system involves strategically placing lumber between a load face and the rear doors of a container. This, however, can be a costly, time consuming, and generally inefficient means of securing a load. In this, the blocking process requires skilled carpenters and is often outsourced to contractors. Moreover, wooden barriers can be time consuming to install. Further wood bracing can be somewhat brittle and subject to failure as a result of an abrupt impact.

In addition to the above, conventional methods of load-blocking with lumber bracing simply can not perform some tasks. For example, the most efficient means of filling an intermodal container is eighty, fifty-five gallon drums, double stacked within a twenty-foot long container. However, if eighty barrels are loaded there are only approximately four inches between the load face and rear doors of the container. Four inches is not enough space to put sufficient lumber to brace a load of eighty drums adequately. Consequently, when wood bracing is utilized as a system of restraint, shippers are forced to ship containers that are not filled to capacity. This reduces transport efficiency and increases transportation costs. Moreover, some types of wood, such as conifer woods, are not acceptable to cross international boundaries without certification of special fumigation or heat treatment processing.

The Department of Transportation has established a standard to determine if a particular restraint system is capable of adequately securing hazardous cargo. In certain instances, conventional load-locking and lumber bracing has not been structurally rugged enough to receive approval to ship hazardous cargo.

Other known means of restraint such as ropes, metal or plastic straps or stands and the like appearing in the past have tended to exhibit impaired performance and are often not functionally suitable to restrain loads under even moderate conditions. Consequently, a need exists for securing lading within intermodal containers, boxcars, truck trailers, and the like that is functionally effective, cost-efficient, labor-efficient, and able to comply with Department of Transportation and Bureau of Explosives regulations. Still further a need exists for securement systems that have enhanced strength characteristics and limit lading travel within a container.

At least one method and apparatus for restraining cargo movement which overcomes some of the foregoing limitations is disclosed in U.S. Pat. No. 4,264,251, of common assignment with the subject application. The invention disclosed in that patent comprises sealing strips that are adhered to opposing sidewalls of a container, an integral strip of bracing material, and a joining mechanism are used to bind the ends of the strips together into a secure and taut restraint across the face of a load.

In the '251 patent, noted above, flexible securement strips are applied in a manner somewhat similar to hanging wallpaper, wherein an adhesive is applied onto a surface within a trailer where adhesion is desired. Then a retaining strip is applied to the adhesive. In addition to this requirement of a separate adhesive, systems appearing in the past sometimes encounter problems associated with weakness at the joints. At the juncture where the strips came together, an opportunity existed for slippage of the joined panels. Moreover, intermodal containers have corrugated walls as noted above. These corrugations make applying a restraining strip to a separate adhesive, which may not have an even application, substantially more difficult.

In addition to the restraining system disclosed in U.S. Pat. No. 4,264,251 other systems have been developed that provide enhanced operating characteristics and advantages, as discussed in the above identified U.S. Pat. Nos. 6,089,802; 6,227,779; 6,607,337; 6,896,459; 6,923,609; 7,018,151; 7,066,698; 7,290,969; and 7,329,074 all of common inventorship as the subject application. The disclosures of these prior patents are hereby incorporated by reference as though set forth at length.

Further to these prior systems of securing lading in intermodal containers increasing attention has been placed on securing heavier and denser loads, including hazardous materials, without abandoning the advantages achieved by previously known commercial systems. Moreover, there is interest in decreasing the elastic and/or plastic elongation and enhancing the vertical securement function so that hazardous materials can be transported with enhanced efficiency and security. In this regard it would be desirable to utilize an eighty, fifty five gallon, drum load within a conventional intermodal container. In this arrangement four steel drums need to be positioned next adjacent to the rear door of an intermodal container. In the past, issues have existed with respect to unacceptable travel of loads which may even come into contact with rear doors of the container during impact. As noted above, for hazardous loads, load contact with the rear doors of a container is not acceptable according to HazMat regulations.

In addition to the above, other restraining systems known in the past required multiple elements which were cumbersome to store, arduous to install, and often required a degree of skilled labor to properly install. Systems using straps, nails, anchors, or bolts all require substantial storage space even when not in use. Furthermore, such systems increase the safety risk to the workers restraining the cargo. Still further such systems have often been unable to satisfy safety and travel limits imposed by regulatory bodies in various countries.

In addition to the above concerns, systems and procedures used in the past relying on accessories located within the cargo container often were not able to secure a partial load. That is, if the load does not extend to the front or rear of the container, such as a centrally located load, the necessary anchors may not be available in an area where they can be effectively used.

Further methods and systems appearing in the past require application of a five foot length of self-adhering contact by a restraining strip with the side walls of a container. It would be desirable if this length could be reduced while concomitantly retaining secure operative attachment of the cargo restraining strips to the side walls of the container.

The limitations suggested in the preceding are not intended to be exhaustive but rather are among many which may tend to reduce the effectiveness of cargo restraining systems known in the past. Other noteworthy problems may also exist; however, those presented above should be sufficient to demonstrate that cargo-restraining systems appearing in the past will admit to worthwhile improvement.

OBJECTS AND SUMMARY OF THE INVENTION

Objects

It is a general object that the subject invention provide a novel method and system to secure a load within an intermodal container, or the like, which will obviate or minimize problems and concomitantly achieve at least some of the desired aspects of lading securement of the type previously described.

It is another general object of the subject invention to judiciously protect cargo from damage during transport and to provide enhanced securement of a load within a container while minimizing shifting of a container load.

It is a specific object of the invention to provide a securement system and method for an intermodal container, and the like, with enhanced securement to the sidewalls of an intermodal container, rail car, trailer and the like.

It is a related object of the invention to provide a securement method and system for an intermodal container, and the like, where the amount of load travel for a given level of impact is minimized.

It is another object of the subject invention to reduce the material and labor costs involved in securing lading within an intermodal container, and the like.

It is a particular object of the subject invention to provide a method for securing cargo that is self-contained and may be installed quickly, reliably, and efficiently by relatively unskilled labor, even in intermodal containers having corrugated walls.

It is another object of the subject invention to provide for efficient and facile removal of the securing system from an intermodal container, or the like, at a cargo destination.

BRIEF SUMMARY OF THE INVENTION

One preferred embodiment of the invention comprises a method for applying a load restraining strip to a side wall of a transport container for use in securing cargo within the transport container. The method includes the steps of providing a load restraining strip have a first end and a second end and a segment at the second end with a self-adhering coating for releasable attachment of the load restraining strip to a lateral wall surface of a transport container. The method further includes determining the shortest distance "A" between an outer contact edge of the load adjacent to the lateral wall surface of the transport container and the lateral wall surface of the transport container.

The method further includes placing and securing the self adhering portion of the load restraining strip against the lateral wall surface of the transport container where the self adhering portion of the strip is less than or equal to four feet in length and the step of placing and securing of the self adhering portion to the lateral wall surface begins at a distance "B" behind an imaginary extension of a contact edge of the load restraining strip with an outer edge near the face of the load. The imaginary extension being normal to the lateral wall surface of the transport container, where the length of:

$B \leq \cot \theta \cdot A$, where $\theta$ is the angle formed between an exterior surface of said load restraining strip and an interior plane of the lateral wall surface of the transport container and $\theta \leq 15°$.

Another aspect of the invention comprises a laminated load restraining strip for use in securing cargo within a transport container subject to shifting forces during transport. The load restraint strip comprises a flexible strip having a first side and a second side and a first end and a second end and being approximately ten to eleven feet in length. A first layer of adhesive coextensively extends along and coats the second side of the flexible strip from the first end to the second end of the first layer of adhesive and a first side of the first layer of adhesive is in adhering contact with the second side of said flexible strip.

A layer of reinforcement is bound to the flexible strip by the first layer of adhesive with a first side of the first layer of reinforcement adhering to the second side of the first layer of adhesive.

A second layer of adhesive extends along and coats a second side of the layer of reinforcement from the second end of the load restraining strip to a position less than or equal to approximately four feet from the second end of the load restraining strip. A second layer of adhesive extends along and coats a second side of the layer of reinforcement from the second end of the load restraining strip to a position less than or equal to approximately four feet from the second end.

A release paper extends coextensively with and is releasably adhered to the second layer of adhesive applied to the second side of the layer of reinforcement, wherein the release paper may be removed from the second layer of adhesive on site and the load restraining strip releasably affixed to a side wall surface of a cargo transport container such that said load restraining strip may be used as a flexible securement element to secure cargo within a transport container.

THE DRAWINGS

Other objects and advantages of the present invention will become apparent from the following detailed description of preferred embodiments taken in conjunction with the accompanying drawings wherein.

Figure 8:
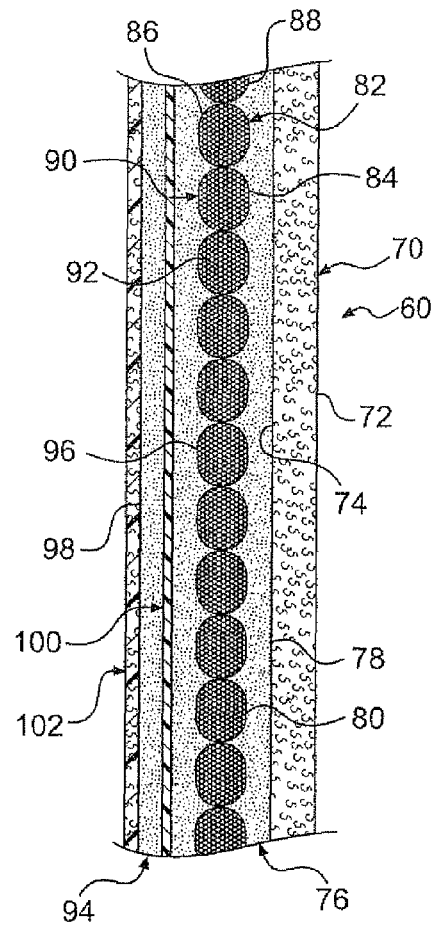
FIG. 8 is a cross-sectional detail view taken along section lines 8-8 in FIG. 7 and discloses details of an interior of one preferred form of a restraining strip for use in accordance with the invention.
Figure 11:
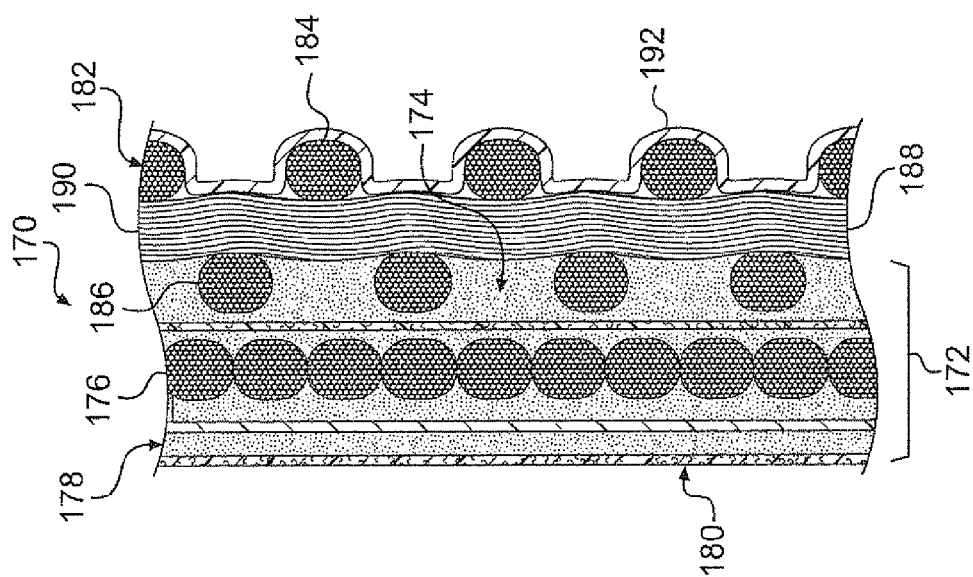
Figure 12:
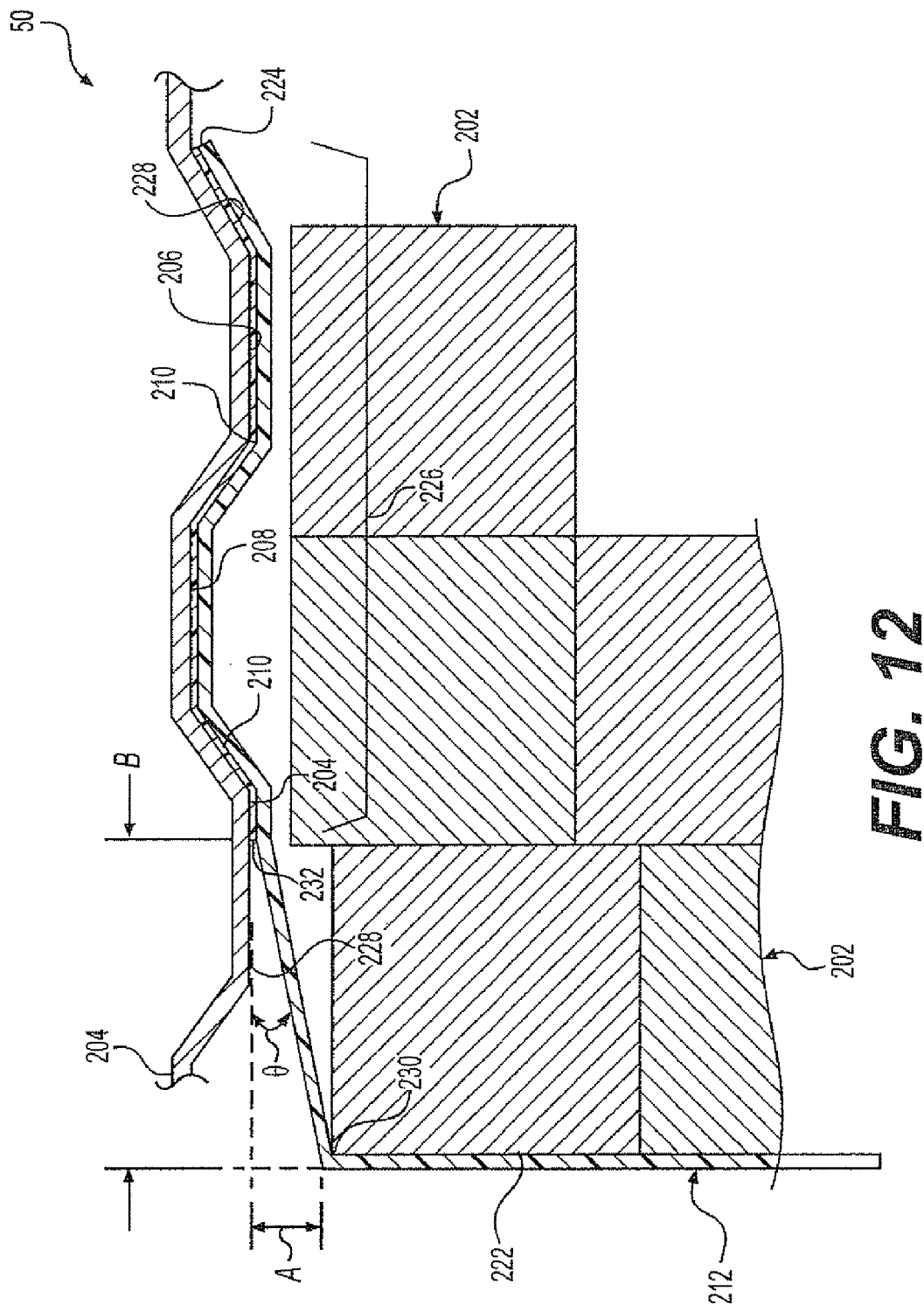
Figure 13:
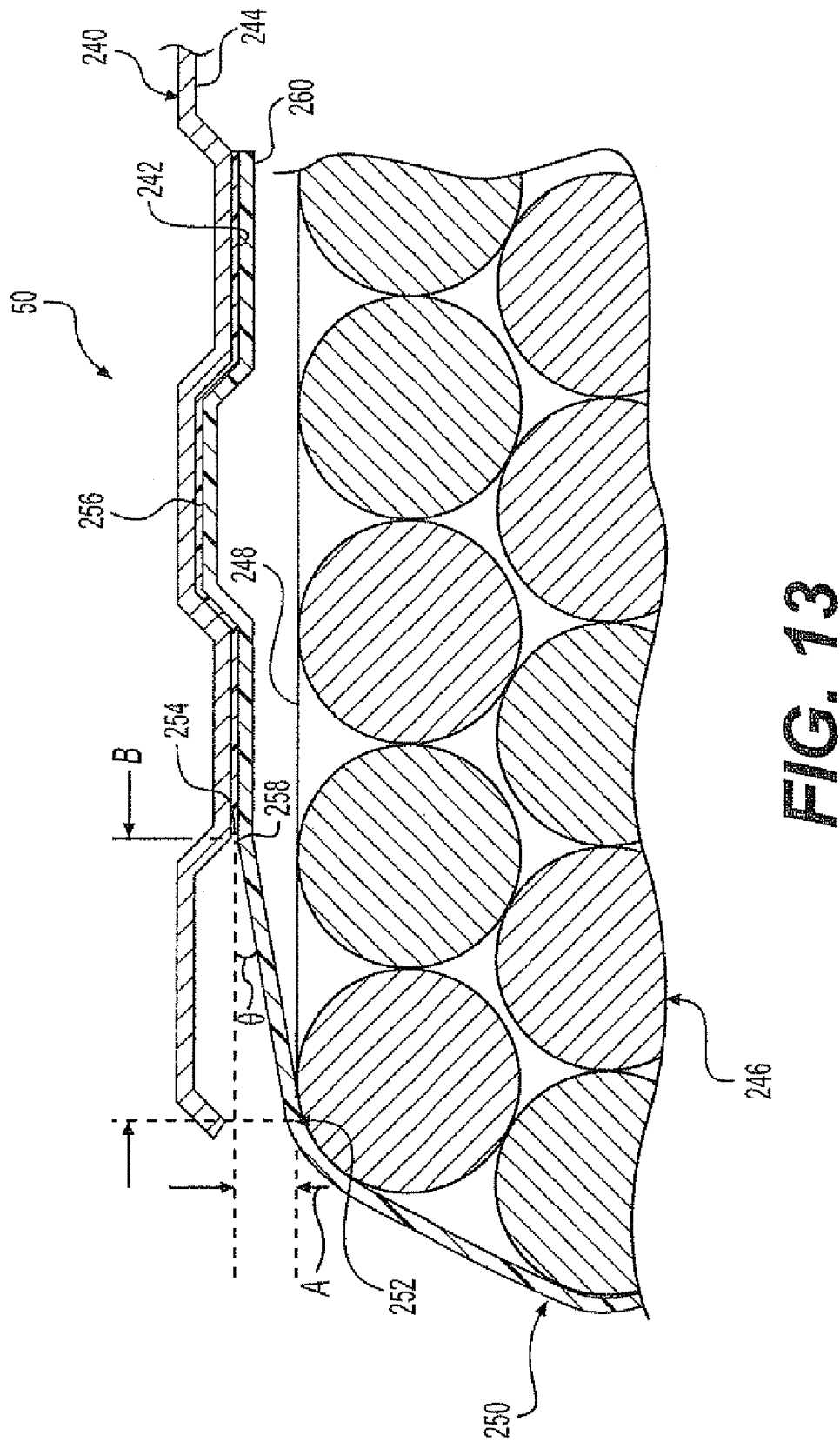
Figure 14:
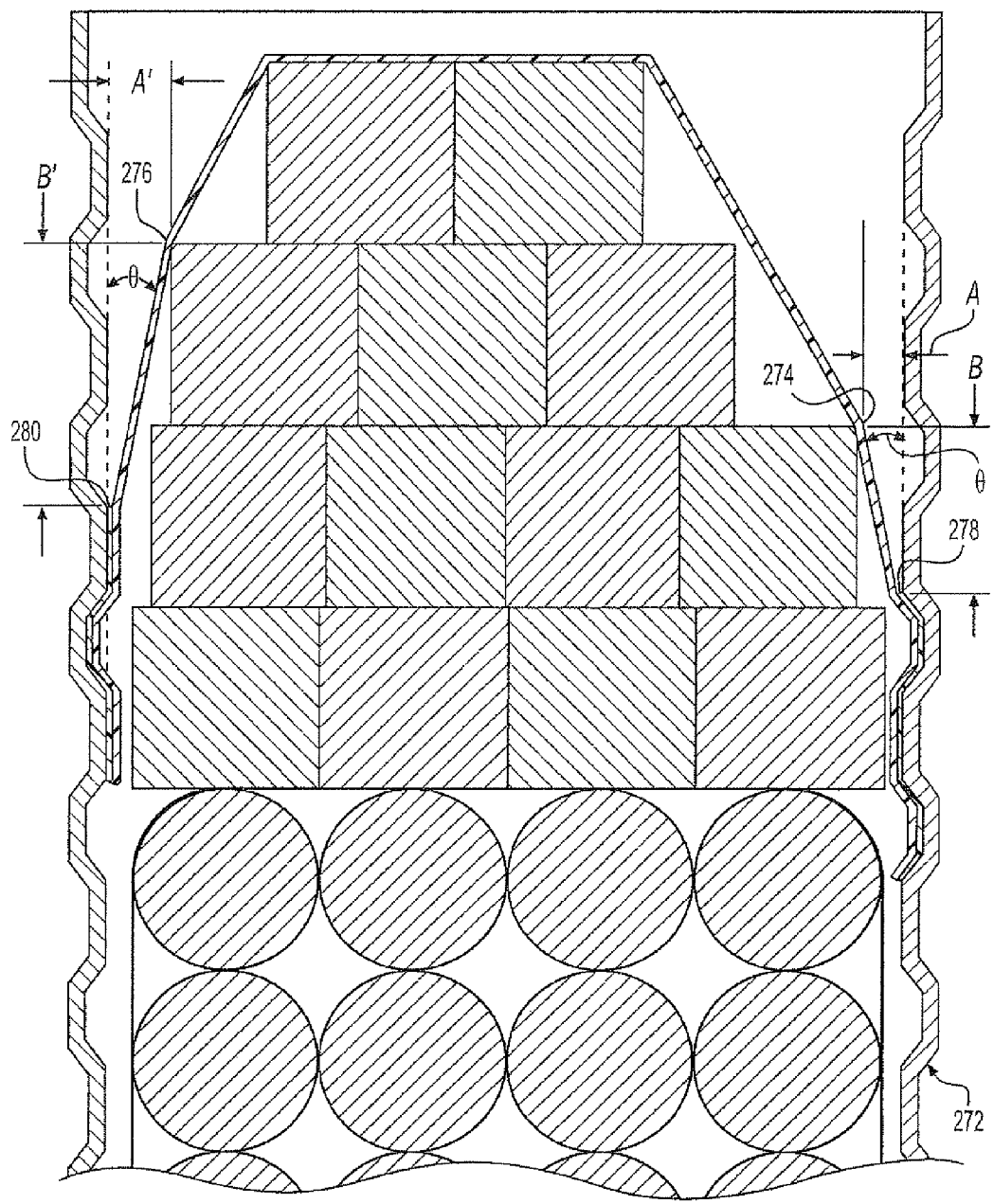

FIG. 11 is a partial cross-sectional view similar to FIG. 8 and discloses yet another alternative detail of the interior of another preferred form of a restraining strip for use in connection with the invention FIG. 12 is an enlarged detail view of a corner of an intermodal container with cargo contained within conventional boxes and an enhanced attachment to a lateral side wall of a container in accordance with the invention;

FIG. 13 is an enlarged detail view of a corner of an intermodal container with cargo contained within conventional drums and an enhanced attachment to a lateral side wall of a container in accordance with the invention; and FIG. 14 is an enlarged partial view of the end face of a container with cargo within boxes and the boxes are placed on pallets with an asymmetric configuration and nonsymmetrical attachment points along the side walls of the container.

DETAILED DESCRIPTION

Context of the Invention

Figure 1:
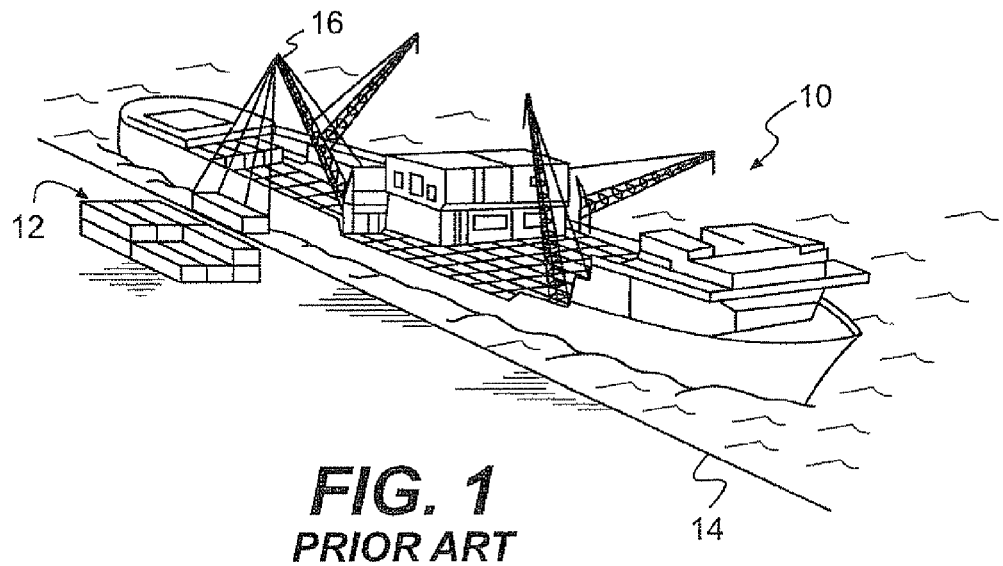
FIG. 1 is an aerial view of a schematic container ship at a dock with cranes lifting and loading intermodal containers onto the ship for ocean going transport.

Referring now particularly to FIG. 1, there is shown one operative context of the subject invention. In this, a ship 10 is shown docked at a port and intermodal containers 12 are being loaded onto the ship. Specifically, FIG. 1 depicts the ship 10 at a dock 14 with cranes 16 lifting and loading the intermodal containers 12 to be stacked on the ocean going vessel 10. The subject invention may be advantageously used to secure cargo within intermodal containers, like the ones being loaded onto the ship 10, within rail cars, truck trailers and the like.

Figure 2:
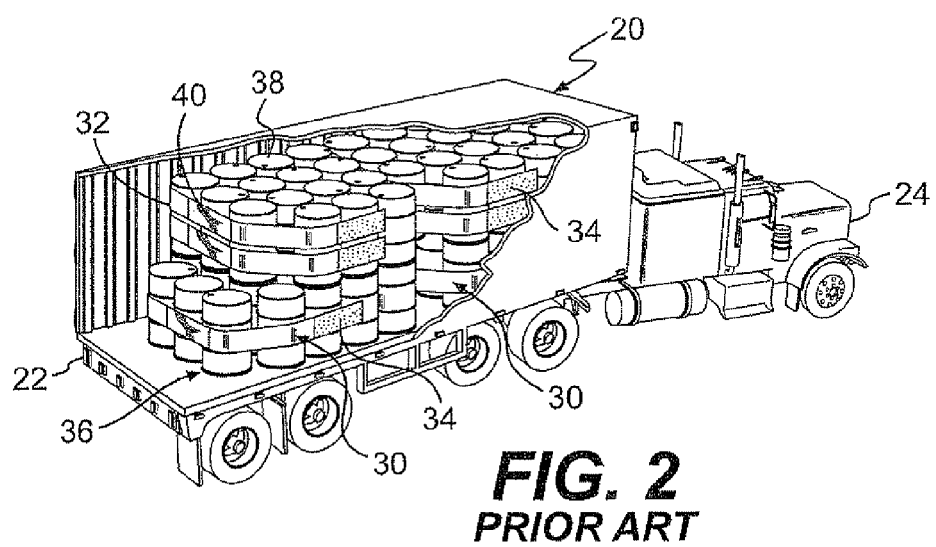
FIG. 2 is an axonometric view showing the interior of an intermodal container secured to a flatbed of a truck trailer, with a partial load secured within the container.

FIG. 2 is an axonometric view that discloses another operating environment of the invention. In this view an intermodal or cargo container 20 is shown mounted upon a trailer 22 which is operably towed by a tractor 24 for land transport. Containers such as these are also operable to be mounted on railway flat cars either directly or as attached to truck trailers 22.

A partially cut away portion of FIG. 2 depicts a cargo restraining strip 30 which is operable to be self-adhered to an interior wall surface 32 of the intermodal cargo container 20. The cargo securement system shown in FIG. 2 comprises a pair of opposing restraining strips 30 self-adhered to opposing side walls of the container 20 by the use of adhesive segments 34 that self adhere to opposing portions of the container side walls. The restraining strips 30 are wrapped around and embrace cargo 36, such as fifty five gallon drums 38. The restraining strips 30 overlap across the face of a load and are folded and drawn tightly together by a torque tool. Then an independent overlying patch segment 40 is applied to the junction to unite the opposing restraining strips 30 from the container side walls around cargo to secure the cargo to the interior wall surfaces of the container 20.

Figure 3:
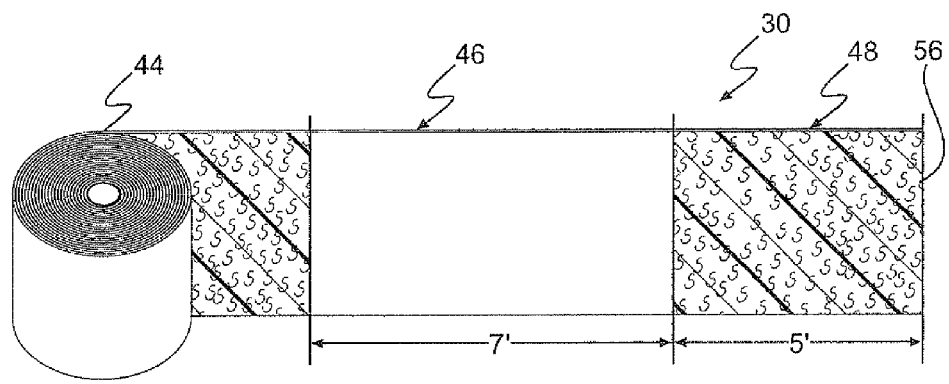
FIG. 3 is a pictorial view of a dispensing roll and a typical twelve foot length of a securement restraining strip of use in restraining cargo within an intermodal container.

Turning to FIG. 3, a general form of a restraining strip 30 such as illustrated in the related patents identified above. The restraining strips 30 are preferably manufactured and transported on reels or rolls 44. A roll 44 of strips 30 are manufactured in an end-to-end continuous fashion in lengths of approximately twelve feet composed with repeating reinforced construction.

An initial, approximately seven foot segment 46 is fabricated with a basic construction throughout the strip 30 and alternate approximately five foot segments 48 include an extra self-adhering adhesive component. In one embodiment the strips 30 are transversely perforated, at approximately twelve foot lengths, so that a strip 30 can be torn off. Alternatively one side of the strip is marked in twelve foot lengths and can be facially cut to create a single approximately twelve foot long restraining strip 30 for use on a job site. Preferably, the restraining strip 30 is approximately fifteen inches in width; however, other widths may be substituted depending on the need for additional strength, which a wider strip can provide.

Figure 4:
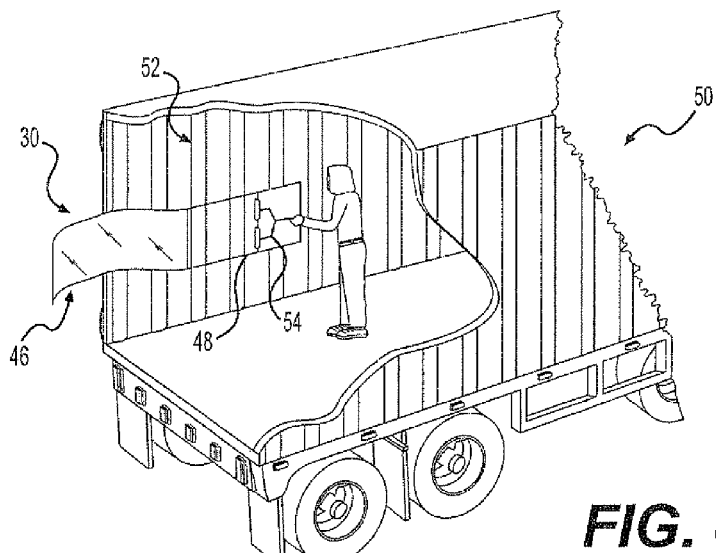
FIG. 4 is an axonometric segmental view partially broken away to disclose application of a conventional restraining strip to an interior wall surface of an intermodal container positioned on a truck trailer.
Figure 5:
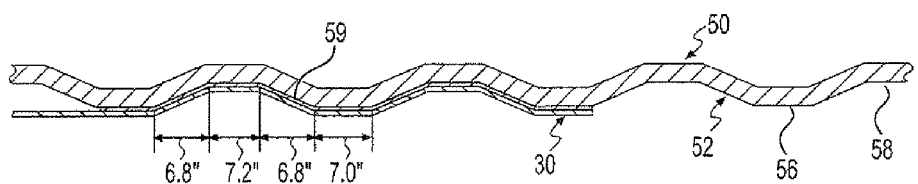
FIG. 5 is a detailed partial cross-sectional view of an intermodal container body showing the conventional length of an attachment of a restraining strip with the side wall of the container.

FIGS. 4 and 5 disclose views of an individual load restraining strip 30 applied in accordance with the inventor's technique of application of the strips to an intermodal container 50, or the like, side wall surface 52. In this, FIG. 4 shows a load restraining strip 30 being applied to the side wall 52 of the intermodal container 50. As taught in the related patents listed above the installer can use a rolling tool 54, or similar device, that is designed to assist the installer in securely adhere the strip 30 to an undulating surface of the intermodal container 50. The installer has peeled away a release paper 56 (note FIG. 3) from the self-adhering segment 48 of the load restraining strip 30 and is shown smoothing the strip against a sidewall of the intermodal container.

FIG. 5 is a cross-sectional view of an intermodal container side wall segment with a load restraining strip 30 applied in the manner shown in FIG. 4. The side wall interior surface 52 of the intermodal container 50 is composed of a repeating sequence of land surfaces 56 and valleys 58. Intermodal containers 50 are fairly standardized and one frequently used container 50 has a lateral land dimension of 7.0 inches, a first sloping surface with a lateral run of 6.8 inches, a valley base of 7.2 inches and a second sloping surface with a lateral length of 6.8 inches as shown in FIG. 5. The adhesive portion of the load restraining strip 30 is designed to cover three or four land surfaces 56 and two or three valleys 58.

The adhesive 59 is an acrylic that exhibits the characteristics of high tack and high shear strength and bonds well to metals. In addition the adhesive must have excellent high temperature and cold temperature characteristics so that the intermodal container can be shipped in all normal ambient operating conditions. Finally the adhesive should have low peel strength characteristics so that when the container is unloaded the load restraining strips 30 may be facilely removed by being peeled away from the side wall surfaces of the container by hand without leaving a residue.

Load Restraining Strips

Figure 6:
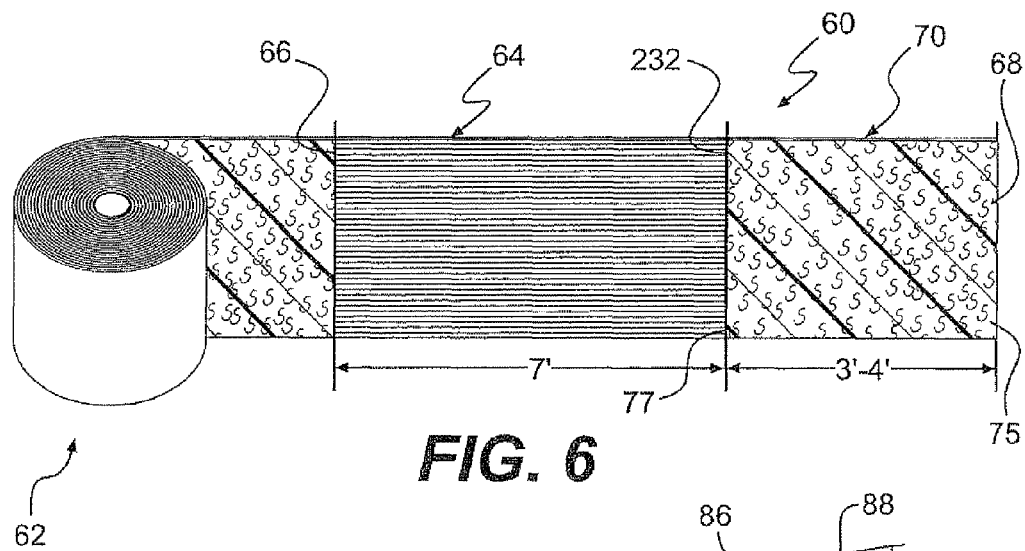
FIG. 6 is a view similar to FIG. 3 which discloses a preferred form of a restraining in accordance with one embodiment of the invention.
Figure 7:
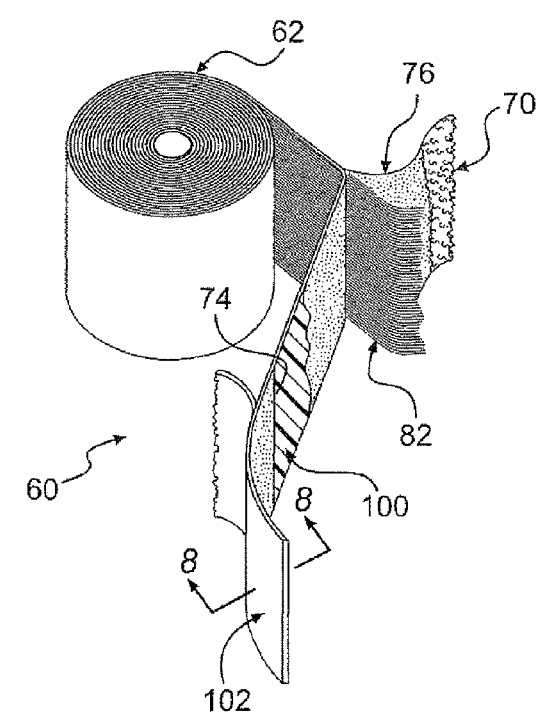
FIG. 7 is an axonometric view, partially broken away disclosing a roll of a restraining strip in accordance with one embodiment of the invention.

Referring now to FIGS. 6 through 8 one preferred form of a high strength load restraining strip 60 in accordance with the subject invention is disclosed.

The restraining strips 60 are manufactured and transported on reels or rolls 62, note FIG. 6, in serial segments of ten to eleven feet in length. Each of the restraining strips 60 have a first end 66 and a second end 68 and an additional self adhering coating 70 for releasable attachment of the load restraining strip 60 to the sidewall of a container. The self-adhering coating or portion 70 being three to four feet in length as illustrated.

FIGS. 7 and 8 shows an expanded, partially redacted view of the restraining strip 60 to disclose internal detail and the relative position of components of the restraining strip 60 in accordance with one embodiment of the subject invention. The restraining strip 60 includes a flexible spun bonded polyester strip 70 having a first or outer side 72 and a second or inner side 74 and a first end 66 and a second end 68 (note again FIG. 6) corresponding to the ends of the strip 60 such that the spun bonded strip 70 extends throughout the length of the restraining strip 60 of ten to eleven feet.

A first layer of adhesive 76 coextensively extends along and coats the second side 74 of the spun bonded polyester strip 70 from the first end 66 to the second end 68 of the spun bonded strip. The first layer of adhesive 76 has a first side 78 and a second side 80. As shown in FIGS. 7 and 8 the first side 78 of the adhesive layer 76 is in self-adhering contact throughout the second side 74 of the flexible spun bonded polyester strip 70.

A layer of reinforcement material 82 is provided having a first side 84 and a second side 86. In this embodiment of the invention the reinforcing material 82 comprises a plurality of substantially parallel longitudinal strands 88 grouped into bundles 90 that extend throughout the length of the restraining strip 60 in a substantially mutually parallel array. Accordingly each of the bundles 90 of the reinforcing material 82 is composed of a plurality of finer denier fibers 92 of reinforcement material such as for example polyester, glass fibers, and the like.

A second layer of adhesive 94 extends along and coats the second side of the layer of reinforcement material 82 from the second end 68 of the load restraining strip 60 to a position less that or equal to approximately four feet from the second end of the load restraining strip 60 (note again FIG. 6). In a preferred embodiment the length of the second layer of adhesive 94 is approximately three feet in length. The second layer of adhesive 94 has a first side 96 overlaying and adhering to the second side 86 of the reinforcement material 82 and a second or outer side 98 for attachment to a side wall of a container.

Although a substrate may not be needed for the second adhesive layer 94 in the event a substrate is necessary or desirable a substrate 100 may be embedded within the second layer of adhesive 94 as shown in FIG. 8. The substrate 100 but may be composed of an acrylic sheet having a plurality of transverse holes or a resin differential polymer with holes to render the substrate porous, or VALERON® which may be fashioned in the form of a screen foundation. Companies such as DuPont, Hoeschst Celanese, and others manufacture such materials. Alternatively, the substrate 100 may not be porous and comprise a sheet of Mylar provided that the shear strength of the adhesive materials is sufficient to carry axial loading as discussed below.

A release material or paper 102 extends over the second or outer most side 98 of the second layer of adhesive 94. The release material 102 enables individual segments of the subject load restraining strip 60 to be manufactured and stored on a reel or core, as shown in FIGS. 6 and 7, and the release paper 102 is peeled off of the individual load restraining strips 60 on site so that the second layer of adhesive 94 may be used by an installer to affix the second end 68 of the load restraining strip 60 to a side wall, or other attachment surface, of a transport container.

The first and second adhesive layers 76 and 94 are composed of compositions that have a high shear strength, a wide operative temperature gradient—including cold weather tackiness and a specific gravity of less than one to displace moisture from the side walls of a container through capillary action. Adhesives of the type that are preferred are available from the Venture Tape Company of Rockland, Mass.

As noted above and shown particularly in FIG. 8 each of the bundles of reinforcement 82 are composed of a plurality of finer denier strands 92 of reinforcing materials. The reinforcement strands 92 may be composed of fine polyester fibers, polypropylene, polyethylene, polyolefin, glass fiber, aramids including Kevlar, carbon fibers, and the like. Kevlar is a polyamide in which all the amide groups are separated by para-phenylene groups. Kevlar is a registered trademark of the DuPont Company of Wilmington, Del. Individual strand bundles of reinforcement 82 are directly abutted against and adhered to the second surface 80 of the first adhesive layer 76 as shown in FIG. 8.

Figure 9:
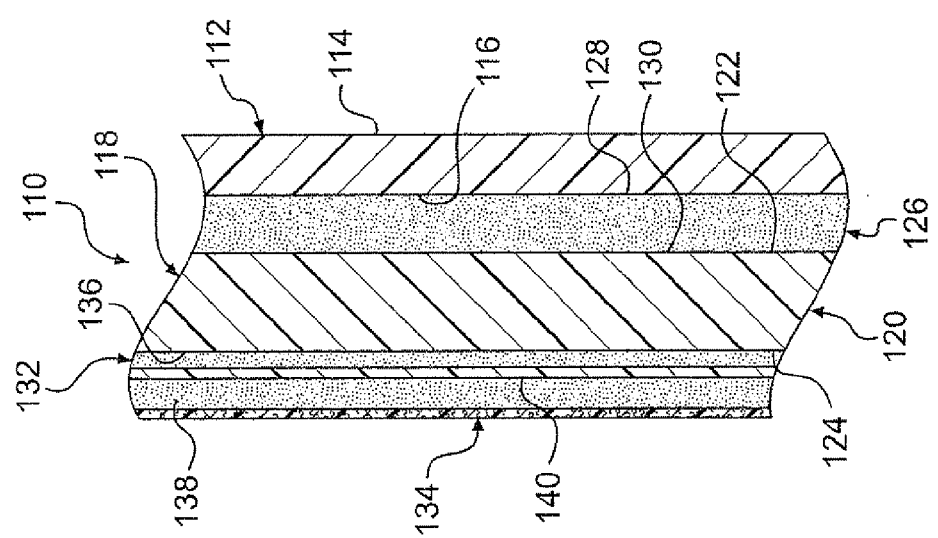
FIG. 9 is a partial cross-sectional view similar to FIG. 8 and discloses an alternative detail of the interior of another preferred form of a of a restraining strip for use in connection with the invention.

Turning now to FIG. 9 a partial cross-sectional view similar to FIG. 8 of an alternative preferred embodiment of a laminated load restraining strip 110 is shown. The restraining strip 110 includes a first flexible, monolithic, strip of material 112 having a first surface 114 and a second surface 116. The restraining strip 110 also includes a layer of reinforcement 118 comprising a second flexible, monolithic, strip of material 120 having a first surface 122 and a second surface 124. In this embodiment the two monolithic strips 112 and 120 are selected with a different thickness but similar composition. In an alternative embodiment the thickness of the strips may be the same or strip 112 may be thicker that strip 118.

The first and second monolithic strips 112 and 120 are preferably composed of an opaque or transparent composition of high strength polypropylene, high density polyethylene or low density polyethlene, polyethleneterephtalate, polyethleneterephtalate glycol, polyvinyl chloride, vinyl chloride monomer, or cross laminated polyethylene. These materials are known to those of ordinary skill in the art and sheets of high strength characteristics are available from various high strength film manufacturing companies. As examples, polyethleneterephtalate ("PET") and polyethleneterephtalate glycol ("PETG") copolyester sheets are available as high strength extruded sheets from the Eastman Chemical Company of Kingsport, Tenn. Cross laminated polyethylene is available in a brand known as Valeron from Valeron Strength Films of Houston, Tex. Although these high strength sheet materials are presently preferred other high strength, monolithic extruded sheets of material are within the purview of the subject invention. Moreover, two or more of these materials may be combined to produce a monolithic or layered composition.

In a preferred embodiment the monolithic sheets or strips of material 112 and 120 are joined together as an operating unit by an intermediate or first layer of adhesive 126 having a first side 128 and a second side 130. The composition of the adhesive may be chosen from a number of commercially available materials as discussed above in connection with the embodiment of FIGS. 7 and 8.

The first adhesive layer 126 may be applied directly to the inner and outer surfaces of the monolithic sheets 112 and 120 during a manufacturing process or may be carried by a central substrate (not shown) which may be a porous spun bond polyester or Mylar. When a substrate is used the adhesive layer 126 is usually divided into two portions of approximately equal thickness.

A second layer of adhesive 132 and release layer 134 are similar to the second layer of adhesive 94 and release layer 102 of the embodiment of FIG. 8 attached at a second end 68 of the embodiment of the laminated load restraining strip 110 disclosed in FIG. 9. The length of the second layer of adhesive 132 and release layer 134 is less than or equal to approximately four feet from the second end of the load restraining 60. In a preferred embodiment the length of the second layer of adhesive 132 and release layer 134 is approximately three feet in length. The second layer of adhesive 132 has a first side 136 overlaying and adhering to the second side of the reinforcement material 118 and a second or outer side 138 for attachment to a side wall of a container. The second layer of adhesive may or may not include a substrate layer 140 as discussed above in connection with FIGS. 7 and 8.

Figure 10:
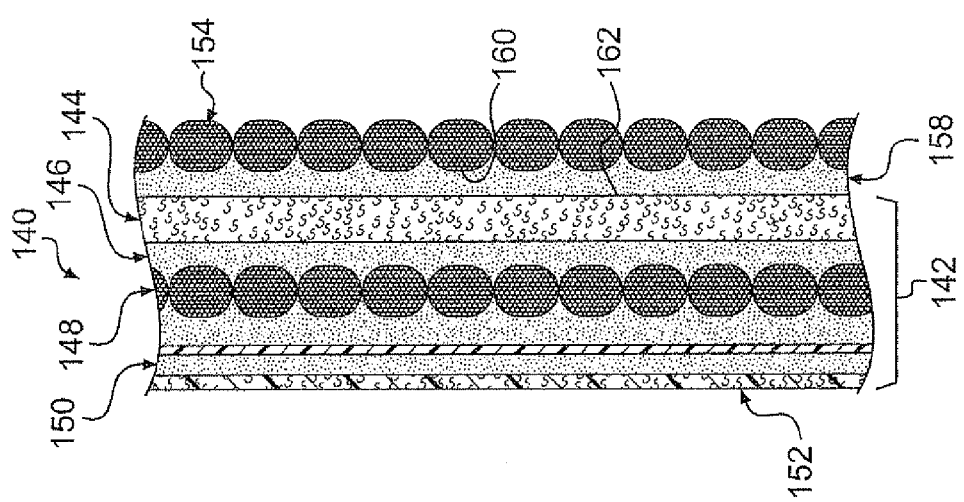
FIG. 10 is partial cross-sectional view similar to FIG. 8 and discloses another alternative detail of the interior of another preferred form of a restraining strip for use in connection with the invention.

FIG. 10 disclosed another alternative preferred embodiment of the invention. In this embodiment a partial cross-sectional view of a laminated load restraining strip 140 is shown which is similar to the laminated load restraining strip 60 of FIGS. 7 and 8 and similar to restraining strip 110 in FIG. 9. In this embodiment a portion 142 of the load restraining strip 140 is identical to the load restraining strip 60 disclosed and described in connection with FIGS. 7 and 8 and the description there is repeated here by reference as though set forth at length including a description of a spun bonded flexible first layer 144, a first layer of adhesive 146, a layer of reinforcement 148, a second short layer of adhesive 150 and a release layer 152 coextensive with the short three to four foot layer of the second adhesive 150.

In addition to the components 142 of the embodiment of FIG. 10 a second layer of reinforcement 154 similar in structure to layer 148, including parallel bundles of finer denier yarn, is attached coextensively to the spun bonded flexible layer 144 with a third layer of adhesive 158 having a first side 160 and a second side 162

FIG. 11 is yet another embodiment of a laminated load restraining strip 170 shown in partial cross-sectional detail similar to FIGS. 8-10. In this embodiment segment 172 is substantially the same as the embodiments of FIGS. 8 and 10 in the sense that a first adhesive layer 174 is similar to adhesive layers 76 and 146, a layer of reinforcement 176 is similar to layers of reinforcement 82 and 148 and a second, three to four foot, layer of adhesive 178 is similar to the second adhesive layers 94 and 150 of the embodiments of FIGS. 8 and 10. Finally a release layer of material 180 is coextensive with the second layer of adhesive 178 and is similar to release layer 102 and 152 of the embodiments of FIGS. 8 and 10.

A difference in the embodiment of FIG. 11 is the provision of a flexible strip 182 composed of longitudinally extending bundles 184 and 186 of a finer denier fiber as described above in reference to FIGS. 7 and 8 and in addition crossing strand bundles 188 which is woven across bundles 184 and 186 to form a flexible cross weave fabric 190 of bundles of finer denier fibers. An outer coating of Mylar 192 is applied over an outer first side of the cross-weave fabric layer 190 forming a first strip 182 of the laminated load restraining strip. In all other respects the embodiment of FIG. 11 is identical or similar to the embodiments of FIGS. 8, 9 and 10 and the description of those Figures is repeated by reference for completeness.

Method of Applying a Load Restraining Strips

Referring now to FIG. 12 a partial cross-sectional view is shown of a corner of a transport container 50 such as shown in FIG. 4 with cargo represented by square containers 202. A lateral side walls 204 of the container 50 include land 206 and valley 208 surfaces connected by sloping angled surfaces 210. Cargo containers 202 are stacked on pallets and the pallets loaded with cargo are secured within the transport container 50 by the provision of laminated load restraining strips 212 of the type discussed and described above in connection with FIGS. 6-11.

A method of applying the load restraining strips 212 for use in securing cargo 202 within the transport container 50 includes the steps of providing a first load restraining strip 212 have a first end extending at least partially across a face 222 of a load and a second end 224 with an adhesive segment 226 beginning at the second end 224 of the load restraining strip 212 and extending along the strip 212 for three to four feet, as discussed above, to an attachment point 232. The self-adhering adhesive segment 226 is operable for releasable attachment of the load restraining strip 212 to the interior lateral wall surface 228 of the transport container 50 as discussed previously.

Before application of the second end segment 226 of the load restraining strip 212 to the side wall 228 of the container 50 a shortest distance "A" is determined between an outer contact edge 230 of a load to be secured and the lateral wall surface 228 of the transport container 50 adjacent to the load contact edge 230.

Following determination of the distance "A", by measurement, a forward edge 232, note FIGS. 6 and 12, of said self adhering portion 70 and 226 respectively of said first load restraining strip 212 is placed onto a lateral wall surface of the transport container behind the contact point 230 of the load extended. The initial contact point 232 to the side wall 228 begins at a distance "B" along the lateral wall surface behind the contact edge 230 where $B \leq \cot \theta \cdot A$, and $\theta \leq 15°$. It has been determined that if the angle $\theta$ is maintained to be less than or equal to 15 degrees the shear contact of the load restraining strip 212 with the first lateral wall surface 228 of the container is enhanced and the length of the contact portion 226 of the strip 212 can be reduced to four feet or less and preferably three feet while maintaining operational and regulatory load restraining characteristics of the restraining system.

Referring now to FIG. 13 another partial cross-sectional view is shown of one corner of a container with an undulating side wall 240 having land 242 and valley 244 sections. In this Figure the load to be restrained is a pallet of fifty five gallon drums 246 which may or may not have an enrobed peripheral sheet of clear plastic 248 surrounding the drums to maintain them as a unit on a pallet.

A load restraining strip 250 of the type described above is attached to the side wall 240 of the container 50 and is positioned across the face of the drums to restrain the drums during transit. In order to properly apply the restraining strip 250 to the side wall 240 a distance "A" is measured from a point of contact 252 of the strip 250 with the edge of the pallet of drums normal to an interior surface of the container wall 240. As discussed above a distance "B" of the first point of contact 254 of an adhesive portion 256 of the strip 250 with the side wall is determined by the formula $B \leq \cot \theta \cdot A$, and $\theta \leq 15°$. As noted in connection with the description of FIG. 12 maintaining the angle $\theta$ to be less than or equal to 15 degrees enables the length of the adhesive portion 256 from the front 258 to the rear end 260 of the adhesive portion 256 of the strip 250 to be less than or equal to four feet with a preferred distance being three feet while maintaining preferred and regulatory attachment standards.

Turning to FIG. 14 there will be seen a cross-sectional view of the tail end of a load of boxes and drums 270 within a container 272 where the face of the load is not symmetric within the container. In this situation the distance "A" on the left side of the load at contact point 274, as an operator faces the load from the rear, can be different than the distance "A'" on the right side of the load at the first contact point 276. In this instance the same computation is made in accordance with the formula $B \leq \cot \theta \cdot A$, and $\theta \leq 15°$, however, the distance "B", or "B'" of initial contact of the adhesive portion 278 and 280 will be different due to the asymmetric nature of the load. In each instance, however the angle $\theta$ will be less than or equal to 15 degrees as discussed above.

In the subject application, and in the claims, the term "transport container" is used in a generic sense for all forms of transport units that are capable of caring cargo. A transport container unit includes but is not limited to intermodal containers, railway cars—such as box cars, truck trailers, and the like having undulating or smooth side wall surfaces In describing the invention, reference has been made to preferred embodiments. Those skilled in the art, however, and familiar with the disclosure of the subject invention, may recognize additions, deletions, substitutions, modifications and/or other changes which will fall within the purview of the invention as defined in the following claims.

What is claimed is:

1. A method of applying a load restraining system for use in securing a cargo load within a transport container having a first lateral wall surface and an opposing second lateral wall surface, the transport container being subject to shifting forces during transport, said method comprising the steps of:
   providing a first load restraining strip have a first end and a second end and a segment at said second end with a self-adhering coating portion for releasable attachment of said first load restraining strip to the first lateral wall surface of the transport container;
   determining a shortest distance "A" between an outer contact edge of a load to be secured and the first lateral wall surface of the transport container adjacent to the load;
   placing said self adhering coating portion of said first load restraining strip onto the first lateral wall surface of the transport container, wherein the self adhering coating portion of the strip is less than or equal to four feet in length and the placement beginning at a distance "B" along the first lateral wall surface behind a contact edge of the cargo load where:

$B \leq \cot \theta \cdot A$, and $\theta \leq 15°$ such that the shear contact of the load restraining strip with the first lateral wall surface of the container is enhanced;

providing a second load restraining strip have a first end and a second end and a segment at said second end with a self-adhering coating portion for releasable attachment of said second load restraining strip to a second lateral wall surface of the transport container generally opposing said first lateral wall surface of the transport container;

determining a shortest distance "A'" between an outer contact edge of a load to be secured and the second lateral wall surface of the transport container adjacent to the load; and placing said self adhering coating portion of said second load restraining strip onto the second lateral wall surface of the transport container, wherein the self adhering coating portion of the strip is less than or equal to four feet in length and the placement beginning at a distance "B'" along the second lateral wall surface behind a contact edge of the cargo load where:

$B' \leq \cot \theta \cdot A'$, and $\theta \leq 15°$;

such that the shear contact of the second load restraining strip with the second lateral wall surface of the container is enhanced;

extending said first ends of said first and second load restraining strips at least partially across the face of the load to be contained within the container; and securing said first ends of said first and second load restraining strips across the face of the cargo load within the container to operably restrain the cargo load within the container.

2. A method of applying a load restraining system for use in securing cargo within a transport container as defined in claim 1 wherein:
the distance "A" is substantially equal to "A'" and the distance "B" is substantially equal to the distance "B'".

3. A method of applying a load restraining system for use in securing cargo within a transport container as defined in claim 1 wherein:
the distance "A" is greater than the distance "A'" and the distance "B" is greater than the distance "B'".

4. A method of applying a load restraining system for use in securing cargo within a transport container as defined in claim 1 wherein:
the point of contact "A" of said first load restraining strip with the face of the cargo load to be restrained within the container is longitudinally offset within the container with respect to the point of contact "A'" of said second load restraining strip with the face of the load to be restrained within the container.

5. A method of applying a load restraining system for use in securing cargo within a transport container as defined in claim 1 wherein:
said self adhering coating portions of said first and second load restraining strips are approximately 4 feet in length.

6. A method of applying a load restraining system for use in securing cargo within a transport container as defined in claim 1 wherein:
said self adhering coating portions of said first and second load restraining strips are approximately 3 feet in length.

7. A method of applying a load restraining system for use in securing cargo within a transport container as defined in claim 1 wherein:
said self adhering coating portions of said first and second load restraining strips are equal in length.

8. A method of applying a load restraining system for use in securing cargo within a transport container as defined in claim 1 wherein:
said self adhering coating portions of said first and second load restraining strips are unequal in length.

9. A method for applying a load restraining strip to a lateral side wall of a transport container for use in securing a cargo load within the transport container, said method comprising the steps of:
providing a load restraining strip have a first end and a second end and a segment at said second end with a self-adhering coating portion for releasable attachment of said load restraining strip to a lateral wall surface of the transport container;

determining a shortest distance "A" between an outer contact edge of the cargo load to be secured adjacent to the lateral wall surface of the transport container and the lateral wall surface of the transport container; and placing and securing said self adhering coating portion of the load restraining strip onto the lateral wall surface of the transport container wherein said self adhering coating portion of the strip is less than or equal to four feet in length and said step of placing and securing of said self adhering coating portion to the lateral wall surface beginning at a distance "B" behind an imaginary extension of a contact edge of said load restraining strip with the face of the cargo load, said imaginary extension being normal to the lateral wall surface of the transport container, where the length of:

$B \leq \cot \theta \cdot A$, where $\theta$ is the angle formed between an exterior surface of said load restraining strip and an interior plane of the lateral wall surface of the transport container and $\theta \leq 15°$.

10. A method for applying a load restraining strip to a lateral side wall of a transport container for use in securing a cargo load within the transport container as defined in claim 9 wherein:
said self adhering coating portion of said load restraining strip is approximately four feet in length.

11. A method for applying a load restraining strip to a lateral side wall of a transport container for use in securing a cargo load within the transport container as defined in claim 9 wherein:
said self adhering coating portion of said load restraining strip is approximately three feet in length.

\* \* \* \* \*